(12) United States Patent
Diehl

(10) Patent No.: US 7,404,466 B2
(45) Date of Patent: Jul. 29, 2008

(54) LOCKING PIN LOCATOR

(76) Inventor: Arnold Wayne Diehl, 1823 Michigan Ave. W. Apt. #1, Battle Creek, MI (US) 49017

( * ) Notice: Subject to any disclaimer, the term of this patent is extended or adjusted under 35 U.S.C. 154(b) by 355 days.

(21) Appl. No.: 11/119,226

(22) Filed: Apr. 29, 2005

(65) Prior Publication Data

US 2006/0243508 A1  Nov. 2, 2006

(51) Int. Cl.
B62D 61/00 (2006.01)
(52) U.S. Cl. .............. 180/209; 280/407.1; 280/149.2
(58) Field of Classification Search .............. 280/149.2, 280/407.1; 180/209
See application file for complete search history.

(56) References Cited

U.S. PATENT DOCUMENTS

| | | | |
|---|---|---|---|
| 4,353,565 A * | 10/1982 | Smith et al. | 280/149.2 |
| 4,993,737 A * | 2/1991 | Torcomian | 280/407 |
| 5,108,123 A | 4/1992 | Rubenzik | |
| 5,460,237 A | 10/1995 | Schueman | |
| 5,480,171 A | 1/1996 | Cheffey | |
| 5,564,725 A | 10/1996 | Brazeal | |
| 5,617,072 A * | 4/1997 | McNeal | 340/431 |
| 5,658,000 A | 8/1997 | Boudreaux | |
| 5,678,834 A | 10/1997 | Wise | |
| 5,716,071 A * | 2/1998 | Stanley et al. | 280/407.1 |
| 5,813,682 A | 9/1998 | Stevens | |
| 5,863,057 A | 1/1999 | Wessels | |
| 6,322,091 B1 | 11/2001 | Lundley | |
| 6,354,642 B1 | 3/2002 | Haggerty | |
| 6,384,716 B1 | 5/2002 | Eckelberry | |
| 6,921,100 B2 * | 7/2005 | Mantini et al. | 280/407 |
| 2003/0155164 A1 * | 8/2003 | Mantini et al. | 180/209 |

* cited by examiner

Primary Examiner—Paul N. Dickson
Assistant Examiner—Barry Gooden, Jr.
(74) Attorney, Agent, or Firm—Joseph K. Andonian

(57) ABSTRACT

A compact, portable locking pin locator device adapted to assist the driver of a semi truck including a tractor and a trailer to locate the trailer over the tandem axle under the back end of the trailer to achieve proper weight and balance of the load carried in the trailer over the wheels of the truck.

3 Claims, 5 Drawing Sheets

LOCKING PIN LOCATOR

This invention relates to a portable locking pin locator device for use by the driver of a semi truck for locating the trailer of the truck in the proper position over the tandem axle under the trailer to achieve the correct and legal weight and balance relative to the different wheel locations of the truck, namely (a) the steering wheels (steers) located at the front of the tractor of the truck, (b) the driving wheels (drives) located at the rear of the tractor and (c) the tandem axle (tandems) located at the rear of the trailer.

BACKGROUND OF THE INVENTION

Semi trucks consist of a tractor and a trailer. For legal and safety concerns the loads carried in the trailers must meet state and federal weight requirements. This can be accomplished most often by positioning the trailer over the tandems in the rear of the trailer. Weight limitations apply to the steers, the drives and the tandems. Movement of the trailer over the tandems affects the weight at all three locations, the steers, the drives and the tandems. The trailer is constructed to slide back and forth over the tandems until the proper position is achieved and then locked into that position. Two parallel rails, fastened longitudinally underneath the trailer (sometimes referred to as the main frame) are fitted over corresponding rails on the tandems (sometimes referred to as the sub-frame). Holes in the trailer rails are positioned to engage extendable pins located on the tandems through holes in the tandem axle rails. Two or four pins are generally employed to lock the trailer and tandems together. The pins are retracted to permit the trailer to slide back and forth over the tandems. The pins are extended to lock the trailer to the tandems when the proper position is achieved to meet positional weight requirements. The mechanism used to extend and retract the pins is located on the tandems and moves all of the pins simultaneously. Holes in the trailer rails are located so they can match the locations of the pins. Thus lining up a hole on one trailer rail with a locking pin on one side of the tandems will simultaneously line up with a hole on the trailer rail on the other side of the trailer with a locking pin on the other side of the tandems.

The difficulty of locating the trailer in the proper position over the tandems axle is that the driver sitting in the tractor cannot see the relative position of the trailer over the tandems at the back of the trailer. After selecting the locking pin hole in the trailer rails to achieve proper weight and balance, a driver working alone must climb back into the cab of the tractor and slide the trailer until he/she thinks the correct position has been acquired. This action is repeated after every move the driver makes to position the trailer over the tandems and determine the relative position of the selected hole in the trailer rail to the pins in the tandems. The driver may have to make several trips climbing in and out of the tractor before positioning the trailer over the tandems at the selected location.

The prior art contains many examples of means for locating the trailer of a semi truck over the tandem axle. With varying degrees of complexity the prior art accomplishes this by some sort of sensor or trigger that detects when the trailer is in proper position and turns on a switch that activates a signal that can be detected by the driver without getting out of the tractor. Some of the newer semi trucks come with built in sensors and signals so assist the driver with this task. Most of the older trucks do not.

U.S. Pat. No. 5,617,072 discloses a mechanism to assist the driver to position the front of the trailer over the fifth wheel assembly mounted on the tractor or the back of the trailer over the tandem axle assembly. In each case the switch is located oh the fifth wheel assembly or the tandem axle assembly while the trigger part of the signaling apparatus is attached to a suitable position on the frame or other structure of the vehicle. A light signals the driver when the proper position is achieved.

U.S. Pat. No. 5,460,237 discloses an air-powered actuator for retracting the locking pins and light means to signal the driver to determine that the pins are in position for retraction. It does not disclose a signal capable of determining when the locking pins are in position to engage selected holes in the trailer rail.

U.S. Pat. No. 5,678,834 discloses means for providing a remote indication of the positioning desired by the driver of a semi truck while the driver remains in the cab. However it does so employing a much more complicated set of components. Thus it employs a rod fitted in a tube and means for attaching one end of the combination to the tandem axle as well as means for securing the adjustment end of the rod within the tube. It also employs a spring attached at one end to the locking pin release handle. Finally it employs a separate visible indicator attached to the trailer.

U.S. Pat. No. 6,354,642 discloses a tool for positioning a tandem rig under a trailer of a semi truck. The tool attaches to the tandem and applies force to the handle, which unlocks the positioning pins. It then signals the driver in the cab that the positioning pins have been freed from their locked position. The tool is not designed to signal the driver when the positioning pins are in position to be locked.

The present invention differs substantially from the above in several ways. First the switch assembly is a single piece that attaches to a single location on the trailer rail. When the switch reaches the selected locking pin location to achieve proper weight and balance in the trailer, it turns on the signal that alerts the driver that the trailer is in the selected position for extending the locking pins. Additionally the Locking Pin Locator comes in a small compact carrying case for easy storing. Being more portable and compact than its prior art alternatives, it performs this function in an inexpensive and simple manner.

SUMMARY OF THE INVENTION

The heart of the present invention comprises a switch assembly fitted inside a pipe whose outside diameter is threaded for about half its length and a mounting bracket with a threaded hole sized to receive the threaded end of the pipe. A pressure sensitive ball or dome shaped switch extends outward from the threaded end of the pipe. The switch assembly includes wiring (hereinafter referred to as a cable) that completes a circuit including a signaling apparatus, preferably a battery and a light. The mounting bracket employs magnets to facilitate attachment to the slide rail of the trailer. The switch is sized to fit into a one of the many holes in a trailer slide rail used to lock the trailer in the position selected to achieve the desired weight and balance of the load over the wheels. A carrying case with a padded interior to house the foregoing components and provide a platform for the light completes the invention. Magnets can be affixed to the carrying case to make it possible to attach the case directly to the side of the trailer or to one of the cross members located underneath the trailers main frame.

To use the present invention, the first step is to release the locking pins. Then the switch assembly, which includes the mounting bracket, is taken out of the case and attached to a locking pin hole on the trailer slide rail anywhere between the locking pin on the front of the tandem axle and the back of the tandem axle. When a light is employed as the signal, the case can be placed on the ground or attached to the trailer using magnets on the outside of the case in a position that makes the light on the case visible to the driver sitting in the cab of the tractor. The pipe is then rotated clockwise into the hole in the mounting bracket until the switch on the end of the pipe contacts the tandem slide rail and turns on the light. The pipe is then rotated counter clockwise away from the tandem slide rail just far enough for the light to go out. The switch assembly is now ready to be moved to the selected hole in the trailer slide rail to achieve the desired weight and balance. The cable extending from the switch assembly to the case can be attached to side of the trailer using a wire clip to prevent the cable from contacting the wheels or any part of the tandem when the trailer is moved. When the driver moves the trailer toward the locking pin, the switch will eventually come in contact with a reinforcement plate fitted over the tandem slide rail at the locking pin location. The pressure on the switch provided by the raised reinforcement plate will turn on the light and alert the driver to stop immediately since the trailer is at the selected position to extend the locking pins. The bracket is then removed and replaced in the case. Finally the locking pins can be extended to the locked position.

The unexpected recognition that the raised reinforcement plate located alongside a locking pin hole on the tandem axle rail can be used to turn on a signal available to the driver is the creative basis for the present invention. In the event that the reinforcement plate is attached to the inside of the tandem slide rail, the procedure must be reversed. The driver will calibrate the switch assembly at the desired hole location on the trailer slide rail until the signal is on and then slide the trailer until the ball/dome enters the hole at the locking pin and the pressure on the switch is released and signal is turned off. In this variation a rolling ball switch is preferred to reduce wear and tear when the ball moves along the tandem slide rail.

LIST OF REFERENCE NUMERALS

Figure 1:
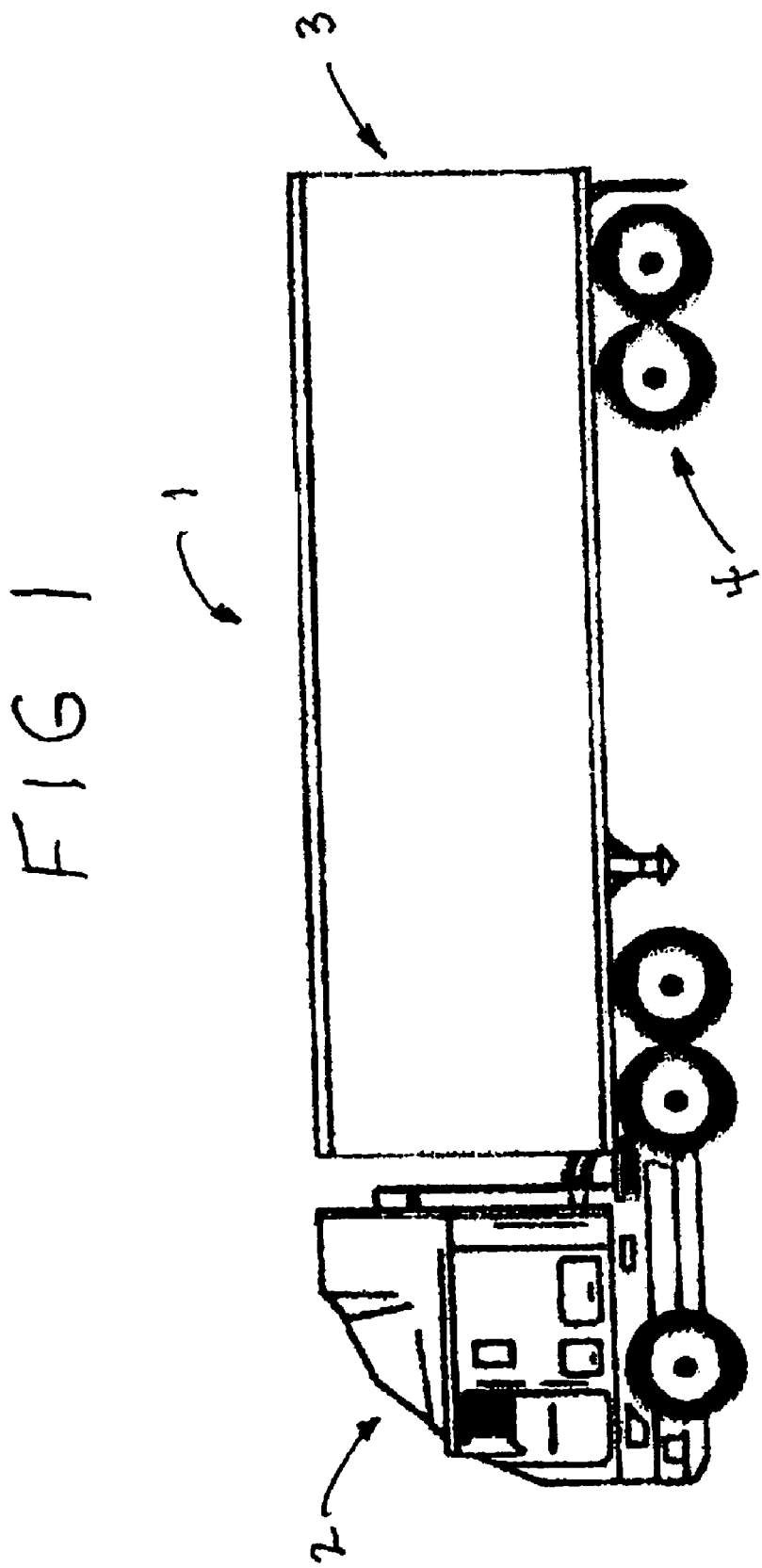
FIG. 1 is a side view of a typical semi truck including a tractor and a trailer.

1 Semi truck
2 Tractor
3 Trailer
4 Tandem axle
5 Trailer cross member
6 Typical hole in trailer slide rail
7 Trailer slide rail
8 Tandem slide rail
9 Reinforcement plate
10 Mounting bracket
11 Threaded center hole of bracket
12a, 12b, 12c, 12d Magnets
13 Switch
14 Locking pin
15 Threaded end of pipe
16 Cable
17 Switch assembly
18 Light assembly
19 Battery clip
20 Foam insert
21 Case
22 Locking pin release handle
24 Switch sub-assembly
25a, 25b, 25c, 25d Screws
26 Threaded pipe
27a, 27b Magnet holes

DETAILED DESCRIPTION

Figure 2:
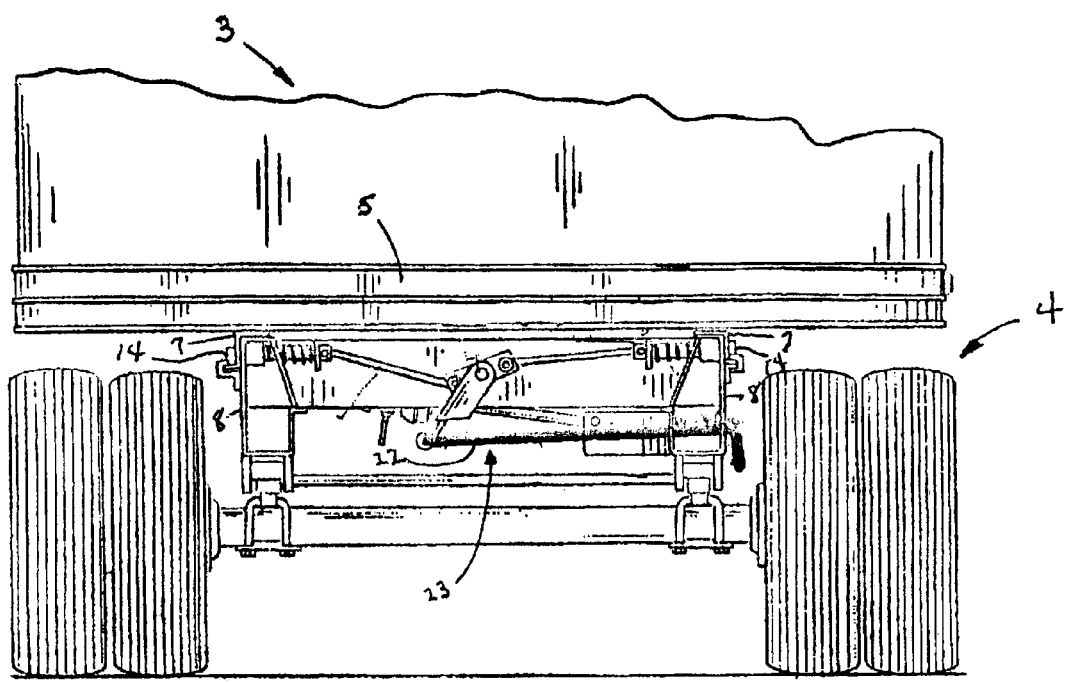
FIGS. 2 and 3 are front and side views of the tandem axle assembly attached to a cutout of the trailer.
Figure 3:
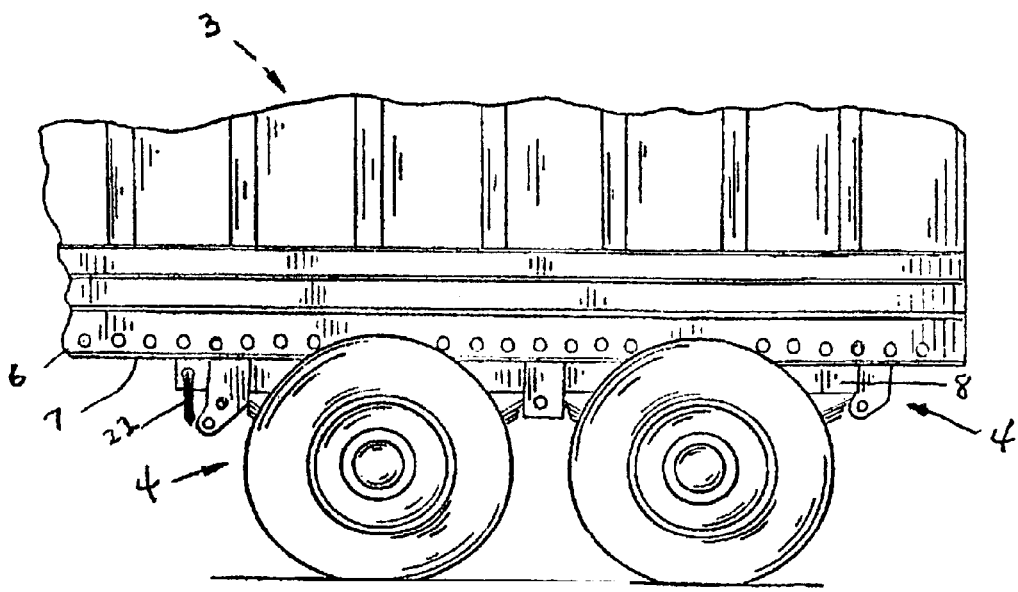

FIG. 1 pictures the basic components of a semi-truck 1, namely a tractor 2, a trailer 3 and a tandem axle 4. FIGS. 2 and 3 provide more detailed pictures of the back end of the trailer 3 coupled to the tandem axle 4 both from the front and the side as well as the mechanism 23 by which the pins are extended and retracted. FIGS. 2 and 3 are essentially reproductions of FIGS. 1 and 2 of U.S. Pat. No. 5,460,237 but omit details pertinent to the invention described and claimed in the patent. The patent also provides a more detailed description of the structure of the trailer and tandem axle and the means by which they are slidably connected employing matching pairs of slide rails and pins. The present invention is useful for trucks described in the patent albeit for a somewhat different purpose than the invention described and claimed in the patent. The invention of the patent helps to disconnect locking pins that are difficult to retract because of added friction brought about for example when the truck is standing on an uneven surface. The present invention helps to locate the trailer over the tandem axle so the pins can be extended to lock the tandem axle in the selected position under the trailer.

Figure 6:
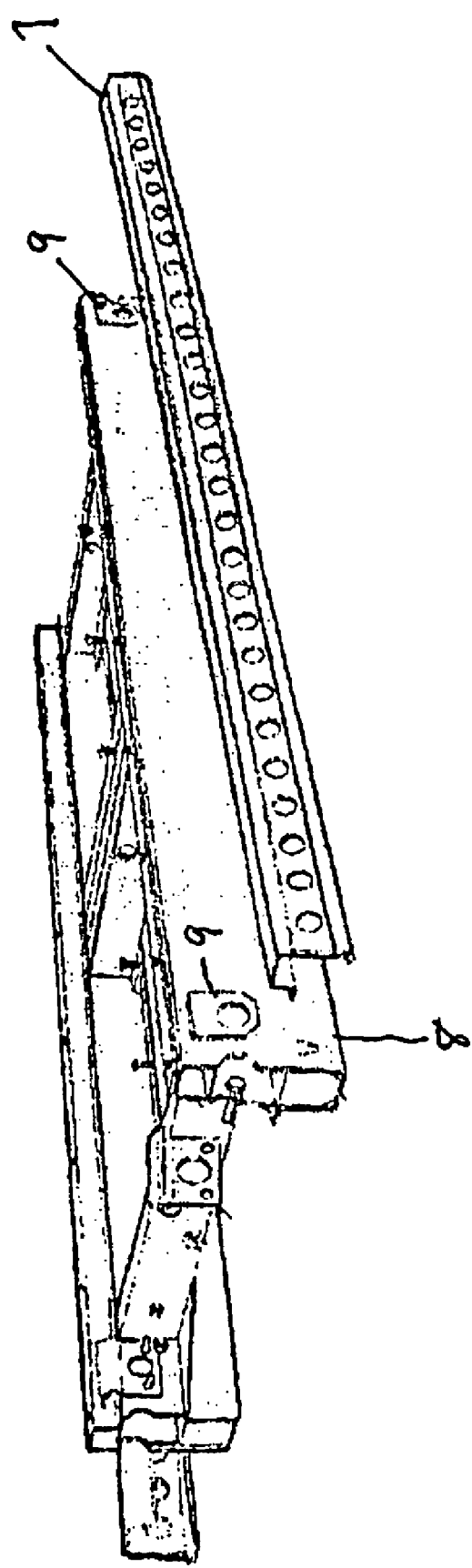
FIG. 6 is a dismantled view of the slide rails to highlight the reinforcement plates around the locking pin holes.

FIG. 6 depicts the disassembled trailer and tandem axle slide rails and provides a clear view of the reinforcement plates around the locking pin holes on one of the tandem axle slide rails.

Figure 4:
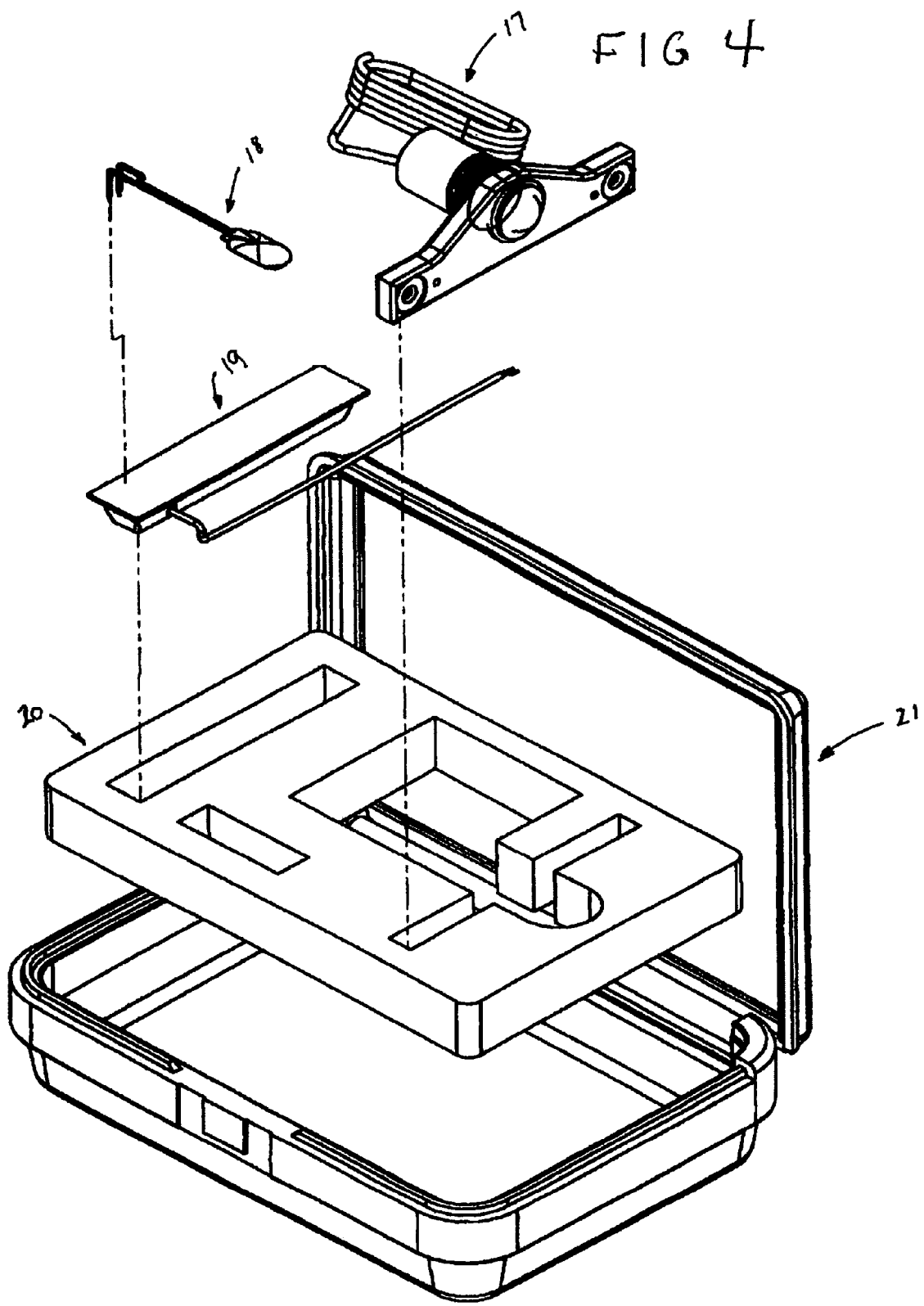
FIG. 4 is an exploded perspective view of the device of the present invention depicting its various components.

The preferred operational configuration of the present invention, pictured in exploded perspective form in FIG. 4, is manufactured by George Risk Industries, Inc. of Kimball, Nebr., and comprises a case 21 (part # 8624), a foam insert 20 (part #8585), a switch assembly 17 (part # 10-137-009), an LED light assembly 18 (part # 10-137-010), a battery clip 19 (part # 5395), and a 9V battery (not shown). A label (part # 8586) and a cardboard cover (part # 8588) (not shown) are added for commercialization.

Figure 5:
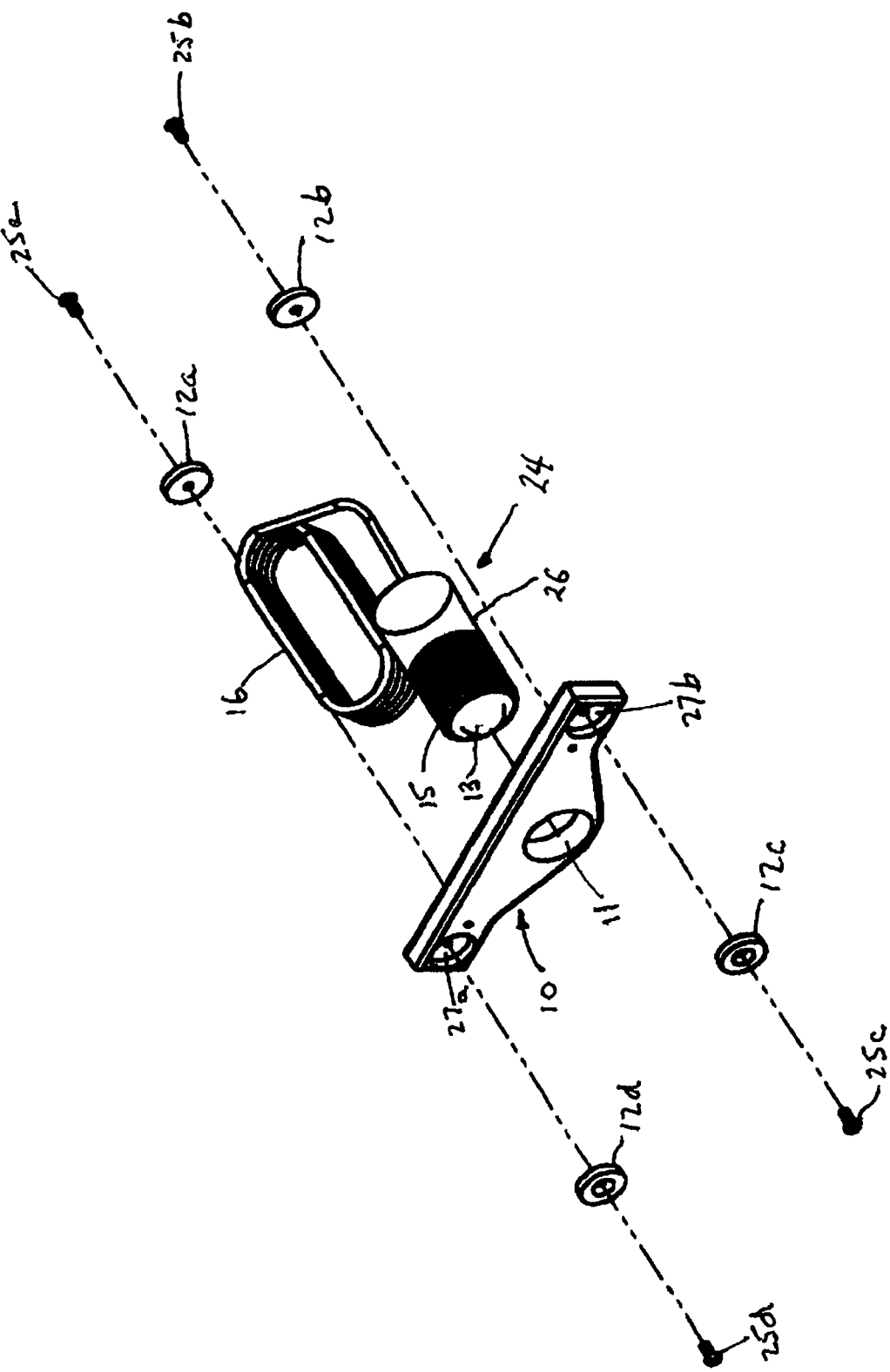
FIG. 5 is an exploded perspective view of the switch assembly depicting its various components.

The preferred operational configuration of the switch assembly is pictured in FIG. 5 and comprises the bracket 10 (part # 8582), the switch sub-assembly 24 (part # 10-137-008), the magnets 12a, 12b, 12c, 12d (part # 5942) and the screws 25a, 25b, 25c, 25d (part # 6915) which attach the magnets 12a, 12b, 12c, 12d to the bracket 10. The switch sub-assembly comprises a threaded pipe 26, a pressure sensitive plunger type micro switch 13, and a cable 16.

The switch assembly 17 is assembled by inserting the switch 13 attached to an 8 ft. long cable 16 (part # 248) into the ¾ in. diameter, 2 in. long threaded PVC pipe 26 (part # 8581) so the active end of the switch 13 extends just beyond the threaded end 15 of pipe 26 and filling the pipe 26 with epoxy (Acamine hardener and Epon resin). The unthreaded end of pipe 26 provides a handle for turning the pipe 26. The threaded end 15 is screwed into the threaded center hole 11 in the plastic bracket 10. Four magnets 12a, 12b, 12c, 12d are attached to the bracket 10 in counter-bored holes 27a, 27b, 27c, 27d in the bracket 10 using screws 25a, 25b, 25c, 25d.

The main assembly is housed in the plastic carrying case 21. The foam insert 20 holds all of the components in place. Cutouts are provided for the LED light assembly 18; the switch assembly 17 and the battery clip 19. The cable 16 is fed through a hole in a clip (not shown) and tied off for strain relief. The clip is suitable for attaching the light assembly 18 to the side of the trailer. The components are hooked together in series under the foam and protected with heat shrink tubing. The final unit is tested and the label and cardboard wrapping attached for retail sale.

Alternatively an audible or radio transmitted signal can be substituted for the light signal. If a radio-transmitted signal is employed, the driver will need a receiver in the tractor.

The foregoing provides both a general description and a specific description of the preferred embodiment of the invention. It should be understood that various substitutions, variations and modifications can be made by those skilled in the art without departing from the spirit and scope of the invention as further delineated in the following claims.

I claim:

1. A locking pin locator for positioning a semi truck having a tractor and a trailer over a tandem axle under the trailer, the trailer and tandem axle being slidably connected to each other by matching pairs of slide rails which can be locked together in several positions by pins extending through holes in the tandem axle slide rails into holes in the trailer slide rails, the locator comprising:
   a pressure sensitive switch;
   a pipe having a threaded end and an unthreaded end;
   a magnetized mounting bracket having a threaded hole into which the threaded end of the pipe can be screwed;
   an electric cable;
   a battery; and,
   a signal;
   wherein the switch is affixed to the inside of the pipe and extends just outside the threaded end of the pipe;
   the pipe is screwed into the hole in the bracket;
   the bracket is adapted to attach to a trailer slide rail and extend the switch into a hole in the slide rail of the trailer far enough to turn the switch on when contacted with a reinforcement plate surrounding a locking pin hole in the tandem axle rail;
   the switch, when turned on, completes a circuit including the cable, the battery and the signal;
   the signal is adapted for signaling a driver sitting in the tractor when the switch is turned on or off.

2. The Locking Pin Locator of claim 1 further comprising an L.E.D. light signal affixed to a case adapted to house the locator and provide a platform for the L.E.D. light signal which can be positioned on the ground or the trailer and be visible to a driver sitting in the tractor and the switch is a ball or dome shaped micro switch.

3. The locking pin locator of claim 2 further comprising magnets on an outside surface of a case adapted to house and carry the locator and attach to the trailer and thereby make the light signal visible to the driver sitting in the tractor of the truck.

* * * * *